(12) United States Patent
Ferguson

(10) Patent No.: US 6,954,707 B2
(45) Date of Patent: Oct. 11, 2005

(54) MULTIPLE SINUSOIDAL BURST FREQUENCY MEASUREMENTS

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 4 days.

(21) Appl. No.: 10/781,455

(22) Filed: Feb. 18, 2004

(65) Prior Publication Data

US 2004/0161027 A1 Aug. 19, 2004

Related U.S. Application Data

(60) Provisional application No. 60/448,408, filed on Feb. 18, 2003.

(51) Int. Cl.[7] .............................................. H04B 17/00
(52) U.S. Cl. ...................................................... 702/75
(58) Field of Search .............................. 702/75–77, 70, 702/79, 106, 189–191, 195; 708/322, 300, 400, 819, 403–405, 821; 381/71.11

(56) References Cited

U.S. PATENT DOCUMENTS 6,629,449 B1 * 10/2003 Kline-Schoder et al. ... 73/19.03
6,778,263 B2 * 8/2004 Ortyn et al. ................... 356/28
2002/0094022 A1 * 7/2002 Bially et al. ................. 375/148

* cited by examiner

Primary Examiner—John Barlow
Assistant Examiner—Cindy D Khuu
(74) Attorney, Agent, or Firm—Francis I. Gray

(57) ABSTRACT

A method of measuring frequencies of multiple sinusoidal bursts in a signal uses a time-domain window that includes all the bursts which are then transformed to the frequency by domain an FFT. The magnitudes of the frequency bins are filtered and smoothed to create a minimum magnitude threshold array. An adaptive threshold is calculated from the minimum magnitude threshold array, maximum magnitudes of the frequency bins and an adjustable constant. The magnitudes are then compared to the adaptive threshold and the number of consecutive frequency bins above the adaptive threshold are counted and, if correct for the given signal, a centroid is determined for each frequency bin. If the number of bursts is not correct, then the adjustable constant is altered and the adaptive threshold recalculated. The centroids are converted to measured frequencies for the multiple sinusoidal bursts.

1 Claim, 9 Drawing Sheets

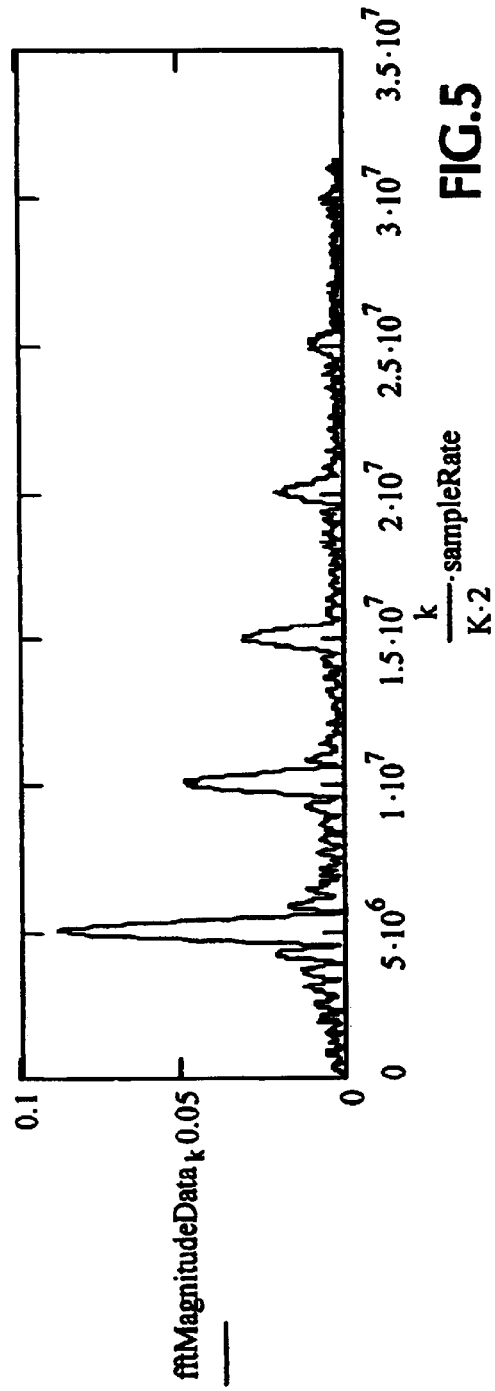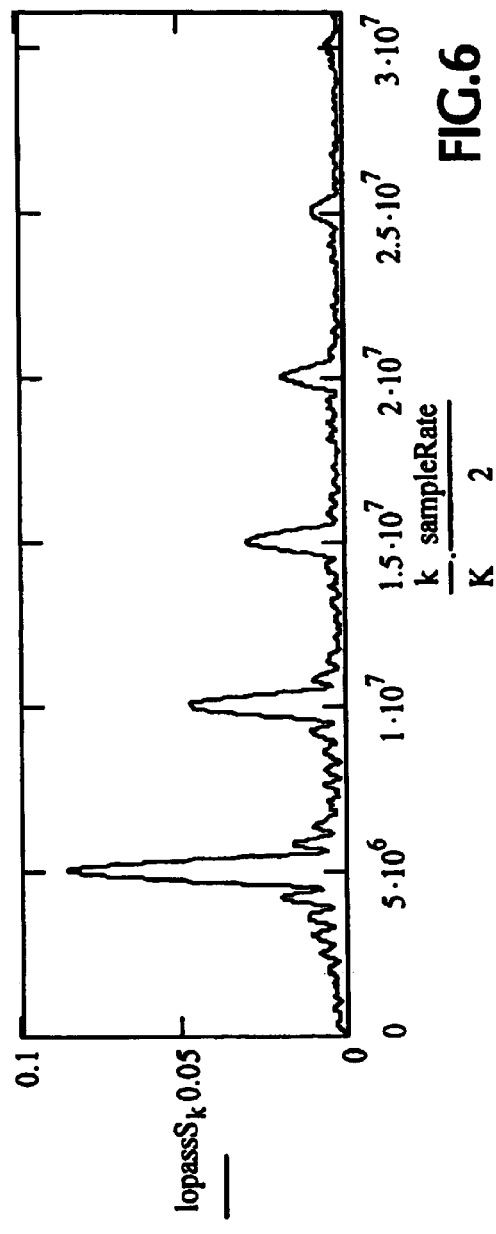

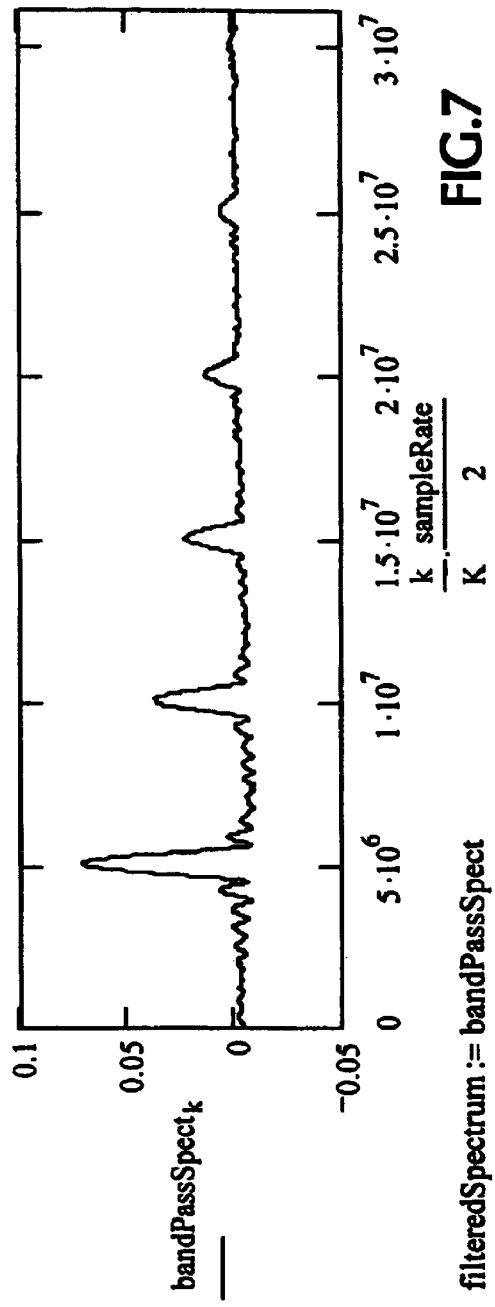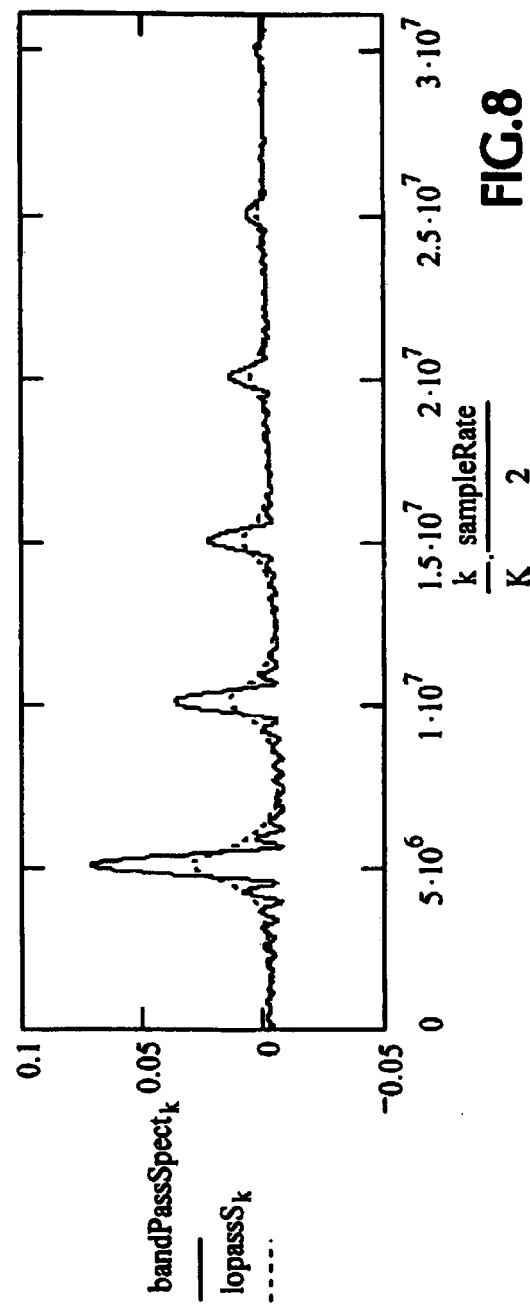

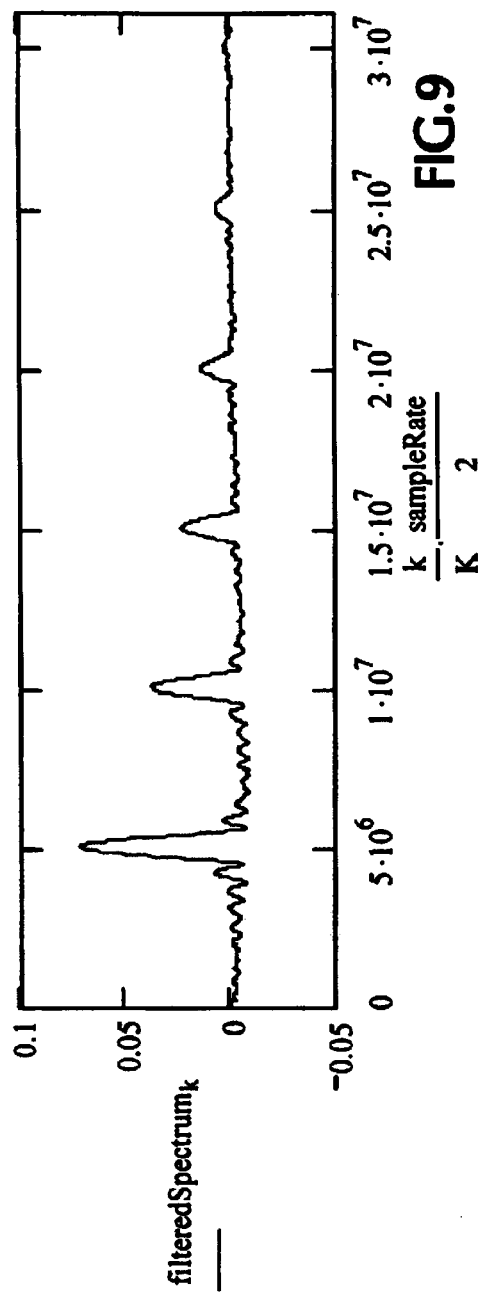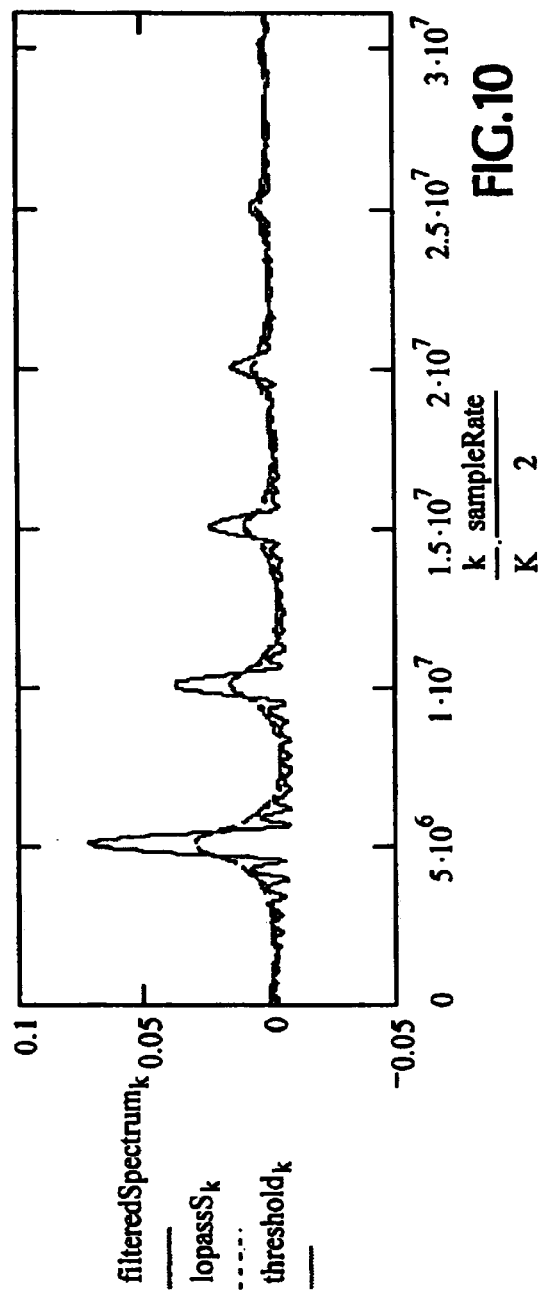

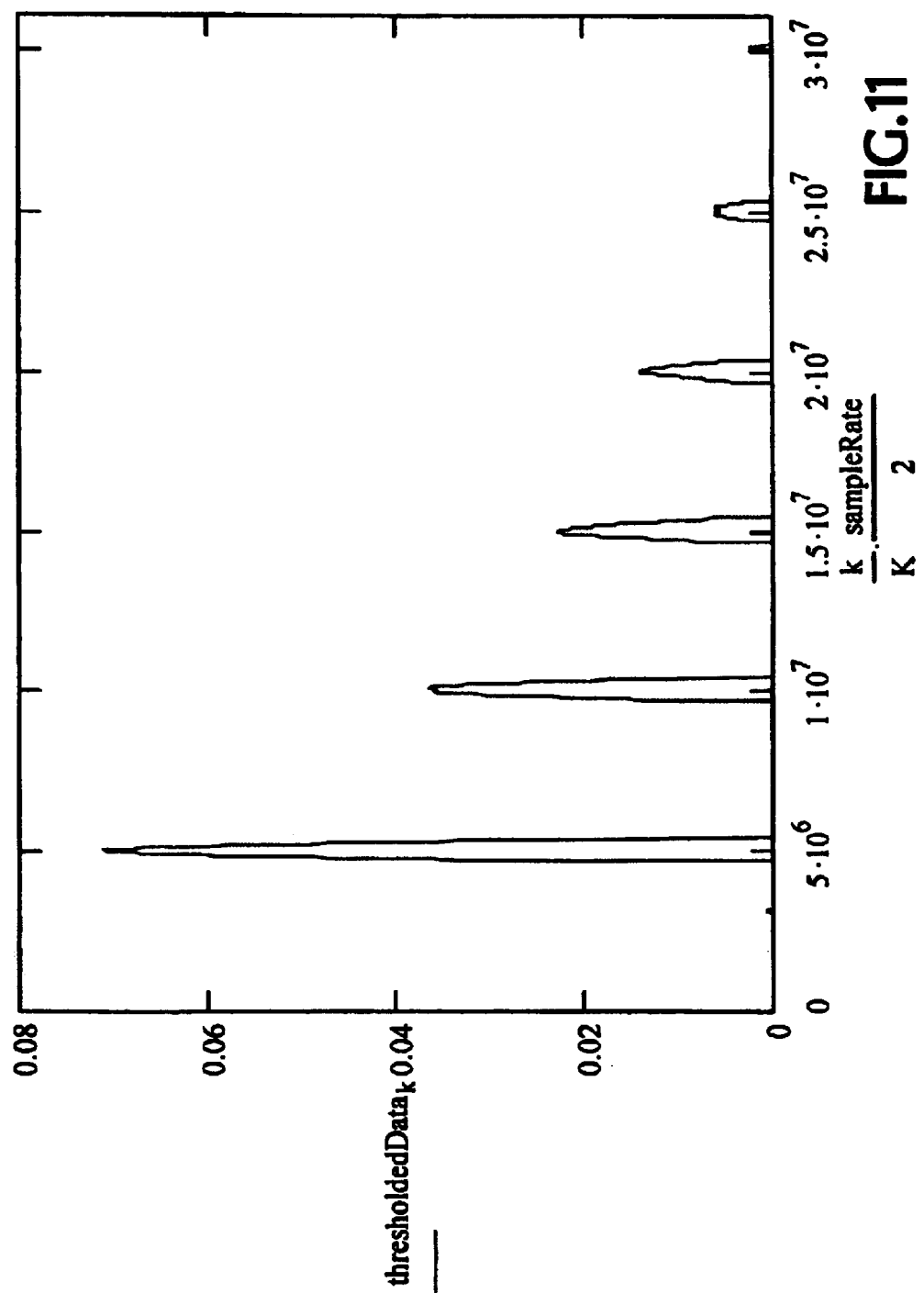

MULTIPLE SINUSOIDAL BURST FREQUENCY MEASUREMENTS

This application claims the benefit of provisional application No. 60/448,408, filed Feb. 18, 2003.

BACKGROUND OF THE INVENTION

The present invention relates to video signal measurement, and more particularly to a method of measuring the frequencies of a multiple sinusoidal burst signal in the presence of noise and other non-linear distortions.

In testing the frequency response of a video system, test signals with multiple bursts of sinusoids at various frequencies per line, i.e., "multi-burst" test signals, are used. Typically five or six bursts, each of a different frequency and amplitude, are used. The specific set of frequencies may vary depending on the video test signal source and video format. These frequencies are not always known a priori when making frequency response measurements. FIG. 1 is a normalized view of a typical multi-burst signal for a high definition video signal showing 2500 samples at a sample rate of 62.5 MHz.

Also devices for both broadcast digital video and computer video, such as set-top boxes and computer graphics cards, may reformat the video such that frequencies may shift. These devices often introduce errors as well, such as noise and frequency aliasing. These errors and digital compression artifacts interfere with prior methods of measuring burst frequencies.

One previous method for measuring video test sinusoidal burst frequencies is based on four consecutive sample points. This method assumes a perfect sinusoid and uses a set of four equations and four unknowns based on:

$$f(t+n)=A*\sin(\omega*(t+n))+DC, n=0 \text{ to } 4$$

$$\sin(\omega*(t+n))=\cos(\omega*t)*\sin(\omega*n)+\cos(\omega*n)*\sin(\omega*t)$$

Solution:

$$\omega=2*PI*f=a\cos(((f(n+3)-f(n))/(f(n+2)-f(n+1))-1)/2)$$

This method has the advantage of only requiring four sample points and a corresponding relatively small number of calculations. For signals very close to the ideal sinusoid, under the right sampling conditions and for most frequencies, accuracy of measurement is very good.

It does however have several disadvantages. If $f(n+2)=f(n+1)$, $\omega$ is indeterminate. This condition occurs for all samples in the case where $\omega=PI/2$ and the sampling phase is an integer multiple of $PI/4$. This condition occurs for ideal sinusoids of any $\omega$ and phase such that the extremes of the sinusoid are sampled symmetrically. In the presence of noise, quantization error and other interference it is possible for this condition to occur for more frequencies, especially low and the highest frequencies. For zero mean error in $f(t+n)$ the error in $\omega$ is not generally zero mean, which means that averaging is not very effective for removing random zero mean errors such as typical noise.

Other methods generally time window individual bursts and use either zero-crossings or fast Fourier Transform (FFT) type methods for finding one frequency, or time window a group of multiple bursts and find individual peaks in the frequency domain. The selection of the time window is either manual, set as an expected location on a video line in anticipation of a specific test signal, or automatic using envelope detection to find burst envelopes. Frequency measurement methods using zero-crossings are the most susceptible to errors due to noise and non-linear distortions. The FFT type methods are less susceptible to noise, but the methods for finding the peak frequencies do not inherently discriminate between burst fundamental frequencies and burst side-lobes due to time-domain windowing, non-linear distortions and noise, especially when one burst is greatly attenuated relative to bursts of nearby frequencies.

Other related methods of frequency component estimation, such as the MUSIC algorithm, signal identification methods such as Prony's method, etc. which approximate eigen vectors and/or poles and zeroes of a linear system are not desirable because they tend to be relatively computationally expensive and/or not particularly robust in the presence of burst side-lobes, correlated non-linear distortions and noise, as in MPEG decoded component analog video. These methods also require an additional step to discriminate between burst fundamental frequencies and side-lobe frequencies.

What is desired is an automated method of measuring the frequencies of sinusoidal test signal components, i.e., multi-burst frequencies, of impaired analog and digital video. In particular it is desired to have one measurement method that is robust in the presence of random noise, quantization error, compressed video impairments and other non-linear distortions and interference. It is desired for the measurement method to work with sinusoidal test signal components with various time windows—duration and envelop shape, burst spacing, etc. Further it is desired for the measurement method to work with different video standards—YPbPr, RGB, high definition, standard definition and computer video—as well as with variable sample rates, not necessarily known a priori or related to the clock rate of the corresponding digital video. Finally it is desired for the measurement method to have both good accuracy and computational efficiency, i.e., relatively low processing for a given accuracy, especially for higher frequencies.

BRIEF SUMMARY OF THE INVENTION

Accordingly the present invention provides a method of automatically measuring the frequencies of multiple sinusoidal bursts by using a time-domain window that includes all the bursts, which bursts are then transformed to the frequency-domain by an FFT. The magnitudes of the frequency bins are filtered and smoothed to create a minimum magnitude threshold array. An adaptive threshold is calculated from the minimum magnitude threshold array, maximum magnitudes of the frequency bins and an adjustable constant. The magnitudes are then compared to the adaptive threshold and the number of consecutive frequency bins above the adaptive threshold are counted and, if correct, a centroid is determined for each frequency bin. If the number of bursts is not correct, then the adjustable constant is altered and the adaptive threshold recalculated. The centroids are converted to measured frequencies for the multiple sinusoidal bursts. The fundamental burst frequencies are measured even in the presence of burst side-lobes, non-linear distortions and noise.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 5 is a graphic diagram view of a frequency spectrum for the multi-burst signal of FIG. 4 according to the present invention.

FIG. 6 is a graphic diagram view of the frequency spectrum of FIG. 5 after lowpass filtering according to the present invention.

FIG. 7 is a graphic diagram view of the lowpass filtered frequency spectrum of FIG. 6 after bandpass filtering according to the present invention.

FIG. 8 is a graphic diagram view of the filtered frequency spectrum of FIG. 7 illustrating creation of a minimum threshold array according to the present invention.

FIG. 9 is a graphic diagram view of the filtered frequency spectrum of FIG. 7 after zeroing frequencies below a cutoff frequency according to the present invention.

FIG. 10 is a graphic diagram view of the comparison of thresholds in FIG. 8 with the frequency response of FIG. 9 according to the present invention.

FIG. 11 is a graphic diagram view of thresholded filtered frequency spectrum data according to the present invention.

DETAILED DESCRIPTION OF THE INVENTION

Figure 2:
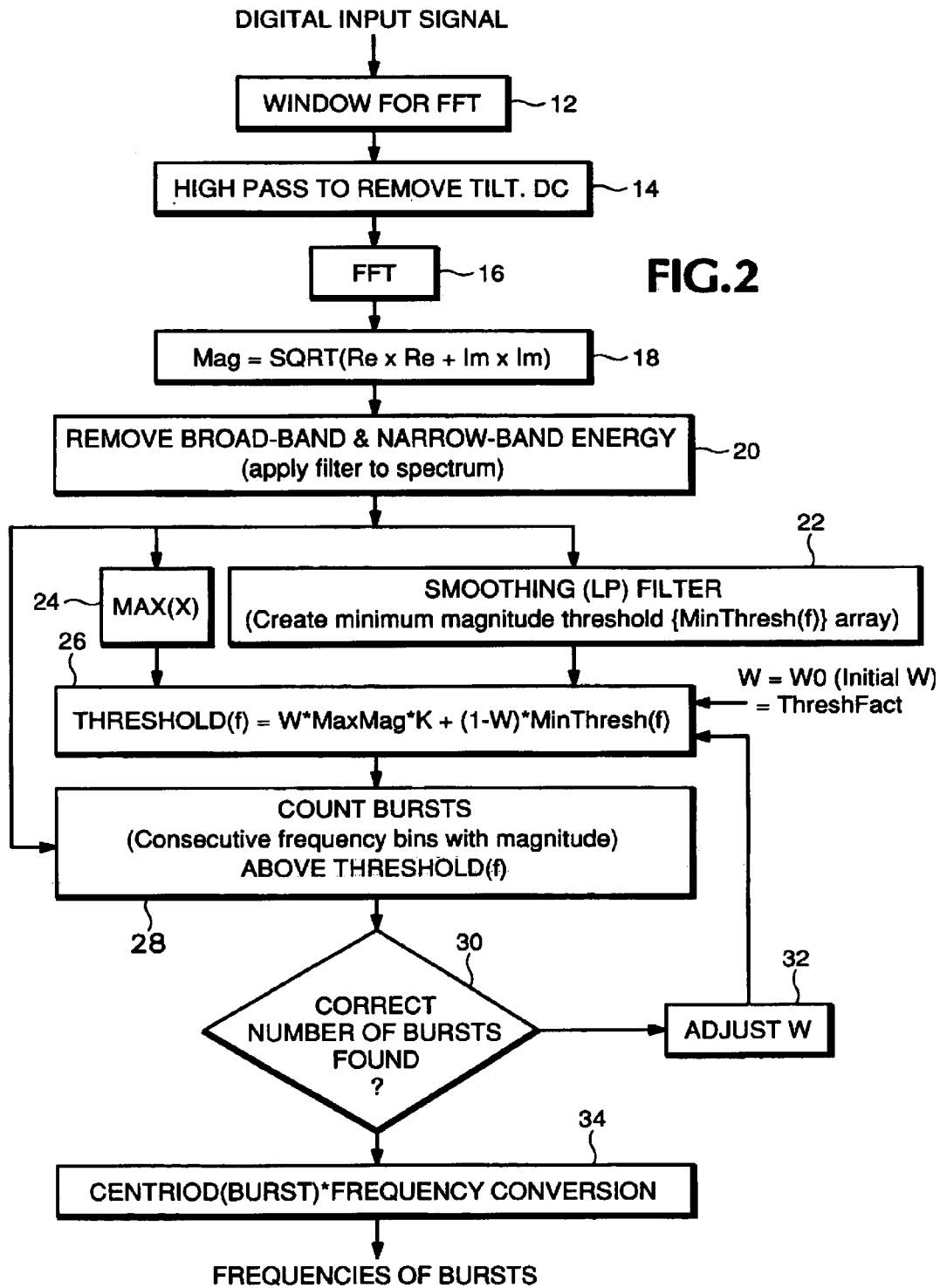
FIG. 2 is a logic block diagram view of a multi-burst frequency measurement algorithm according to the present invention.

Referring now to FIG. 2 an FFT method is described using a time window that includes all bursts of a multiple burst sinusoidal signal without repeating any of the bursts. An adaptive threshold is used to discriminate between burst fundamental frequencies and side-lobe frequencies, noise and other interference as described below.

Figure 1:
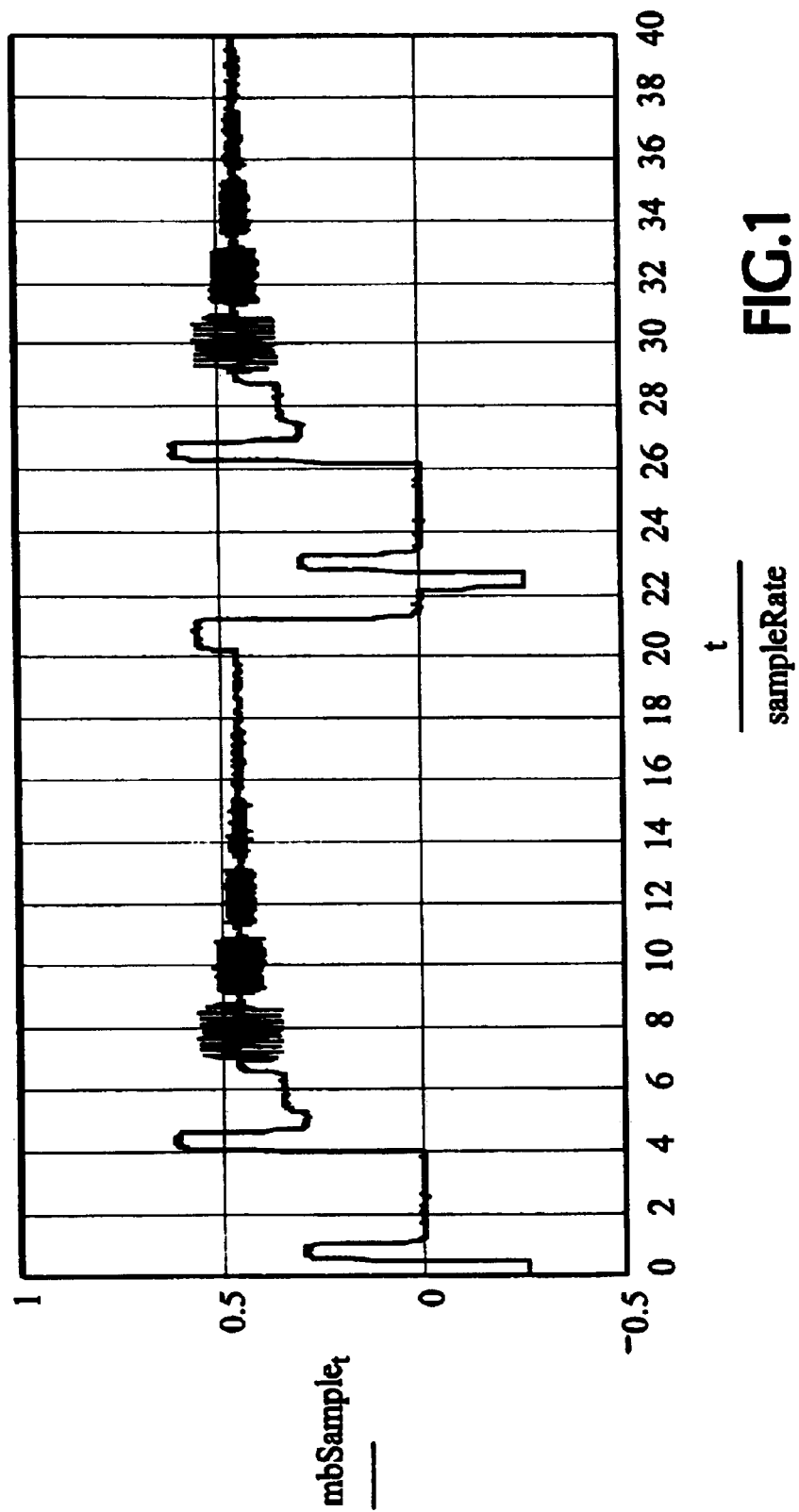
FIG. 1 is a graphic diagram view of a typical multi-burst frequency signal for a high definition television signal.
Figure 3:
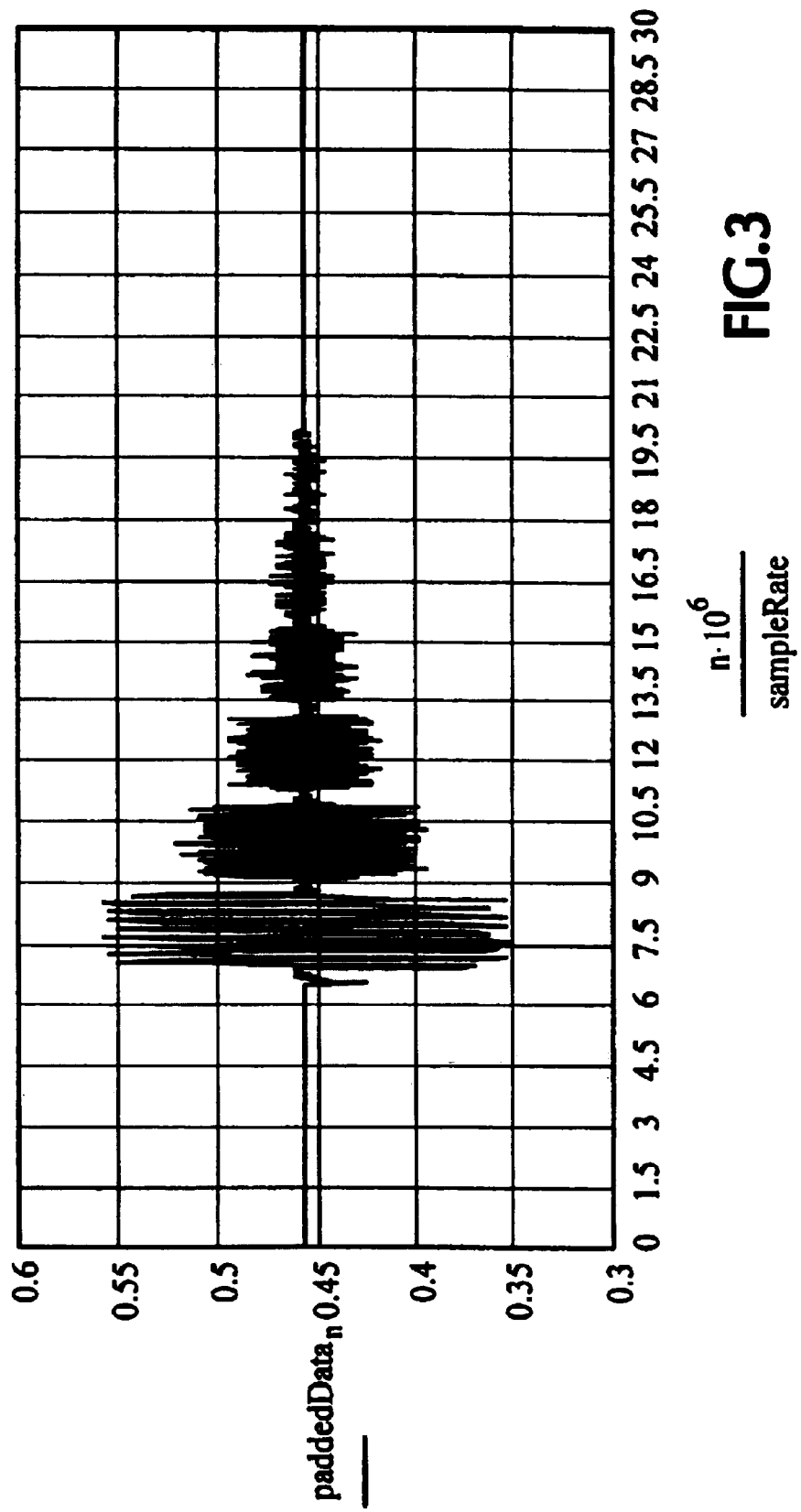
FIG. 3 is a graphic diagram view of a time domain windowed multi-burst frequency signal with padding according to the present invention.
Figure 4:
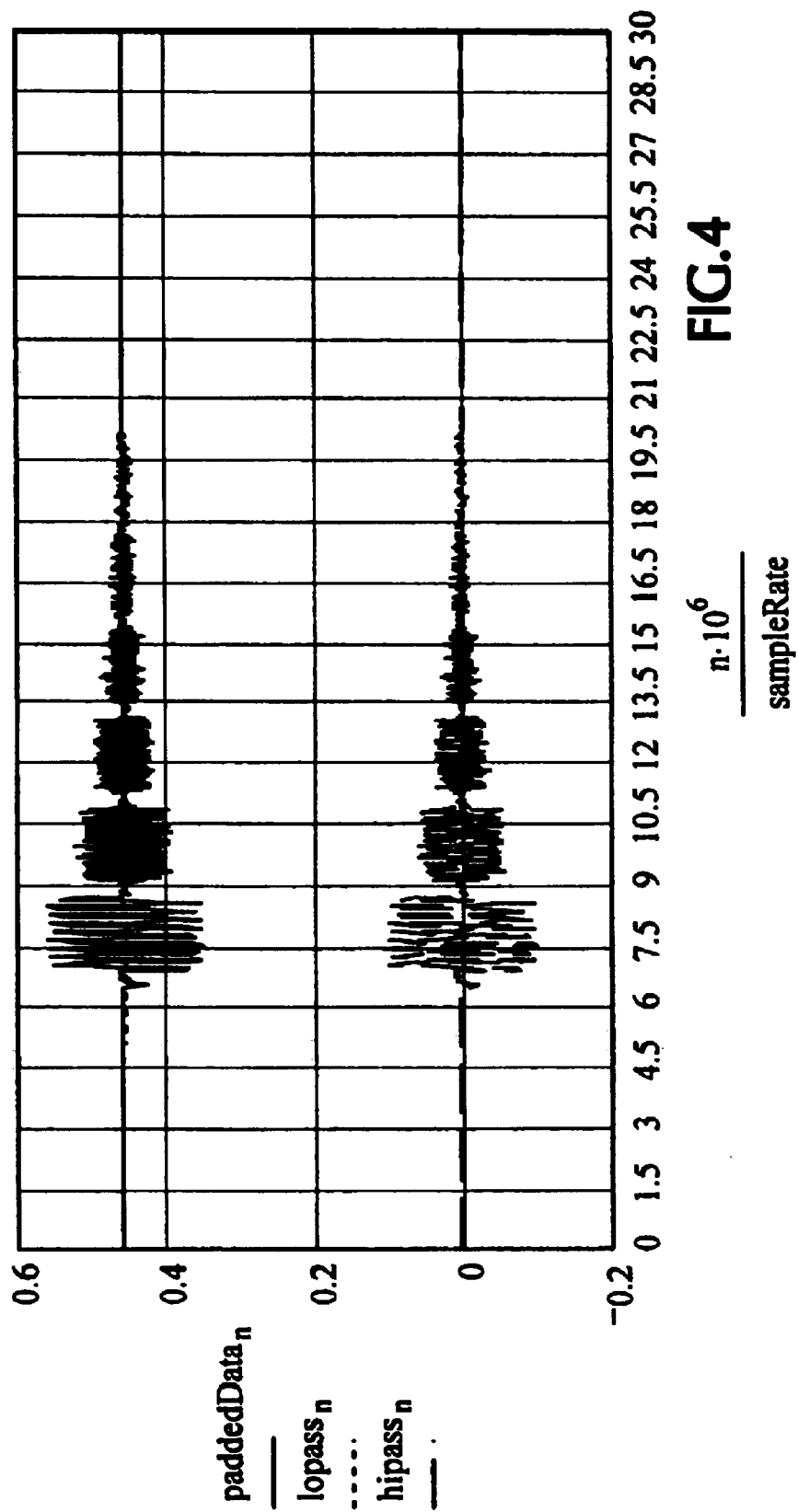
FIG. 4 is a graphic diagram view of the multi-burst frequency signal of FIG. 3 filtered to remove DC and tilt according to the present invention.
Figure 12:
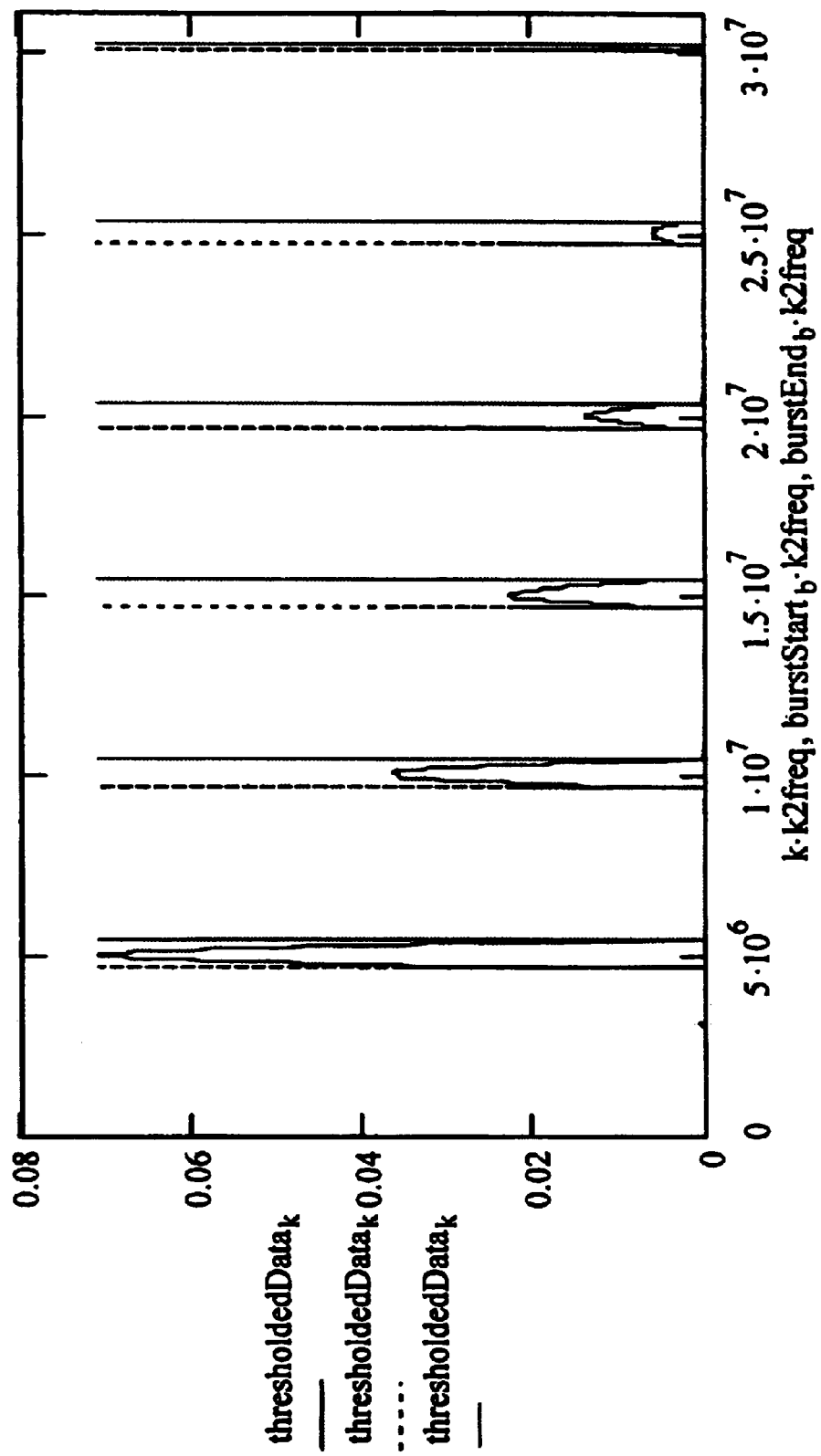
FIG. 12 is a graphic diagram view illustrating location of centroids for the thresholded filtered frequency spectrum data according to the present invention.

The multiple burst sinusoidal signal in a digitized format is prepared for FFT by high pass filtering and extending the data length to power of two. A time-domain window for the FFT (12) is applied to the input signal based upon the expected length of the multiple burst sinusoidal signal before repeating, i.e., the number of bursts expected—for video multi-burst test signals the time-domain window would approximately equal the active video portion of a single line. As shown in FIG. 3 the burst interval of FIG. 1 is extracted and padded at each end in this example to extend the data length to a power of two. The windowed portion is then high pass filtered (14) to remove tilt and DC to produce the lower waveform of FIG. 4. The resulting windowed portion is then processed by an FFT 16 and the resulting magnitudes (18) are recovered as the square root of the sum of the squares of the imaginary and real portions of the FFT output, producing the waveform shown in FIG. 5. The magnitude values are then filtered (20) to remove narrowband (see FIG. 6) and broadband energy (see FIG. 7). The filtered FFT data is input to a smoothing filter 22 to create a minimum magnitude threshold array {MinThresh(f)} (see FIG. 8). The resulting data may be bandpass filtered to zero or skip frequencies below a low frequency cutoff value (see FIG. 9). A maximum magnitude, MAX(X), also is determined (24) from the filtered FFT data. An adaptive threshold, THRESHOLD(f), is then calculated (26) as a function of the maximum magnitude, the minimum threshold array and an adaptive constant, W (see FIG. 10). The adaptive threshold is applied to the filtered FFT data (see FIG. 11) and the number of bursts are counted (28), i.e., the number of consecutive frequency bins with a magnitude above THRESHOLD(f). The number of bursts from the count step 28 are tested (30) to determine if it is less than or greater than expected or correct. If the number of bursts is less than expected for the particular test signal, the adaptive constant is adjusted (32), the adaptive threshold is recalculated and a new burst count is determined. If the number of bursts is correct, then for each burst a centroid is determined which is converted to a frequency (34) (see FIG. 12). The result is a frequency determination for each burst in the multiple sinusoidal burst signal.

Thus the present invention provides a frequency measurement method for multiple sinusoidal burst signals that has the advantages of FFT methods with the additional advantage of being able to discriminate peak frequencies in the presence of burst side-lobes, non-linear distortions and noise, especially when one burst is greatly attenuated relative to bursts of nearby frequencies, by using an adaptive threshold as a function of frequency derived from the FFT magnitude values.

What is claimed is:

1. A method of measuring frequencies of multiple sinusoidal bursts in a signal comprising the steps of:

performing a Fast Fourier Transform (FFT) on a portion of the signal within an adaptive time-domain window that encompasses the multiple sinusoidal bursts;

calculating an adaptive threshold as a function of frequency based on data obtained from the FFT;

applying the adaptive threshold to the FFT data to identify frequency bins having a magnitude greater than the adaptive threshold; and determining a centroid for each identified frequency bin and converting the centroid to a frequency to provide measured frequencies for the multiple sinusoidal bursts.

* * * * *